(12) United States Patent
Georgiev

(10) Patent No.: US 7,765,378 B1
(45) Date of Patent: Jul. 27, 2010

(54) UTILIZATION OF MEMORY STORAGE

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 1469 days.

(21) Appl. No.: 10/314,900

(22) Filed: Dec. 9, 2002

Related U.S. Application Data

(63) Continuation-in-part of application No. 10/161,219, filed on May 31, 2002, now abandoned.

(60) Provisional application No. 60/295,268, filed on Jun. 1, 2001, provisional application No. 60/296,047, filed on Jun. 5, 2001, provisional application No. 60/385,351, filed on May 31, 2002.

(51) Int. Cl.
*G06F 12/00* (2006.01)
*G06F 13/00* (2006.01)
*G06F 13/28* (2006.01)

(52) U.S. Cl. ....................................................... 711/173
(58) Field of Classification Search ................... 711/173
See application file for complete search history.

(56) References Cited

U.S. PATENT DOCUMENTS

| | | | |
|---|---|---|---|
| 4,607,346 A * | 8/1986 | Hill | 711/170 |
| 4,881,164 A * | 11/1989 | Hailpern et al. | 711/207 |
| 5,581,726 A * | 12/1996 | Tanaka | 711/134 |
| 5,588,110 A * | 12/1996 | DeKoning et al. | 714/5 |
| 5,636,356 A * | 6/1997 | Kakuta et al. | 711/114 |
| 5,729,228 A * | 3/1998 | Franaszek et al. | 341/106 |
| 5,737,745 A * | 4/1998 | Matsumoto et al. | 711/114 |
| 5,754,756 A * | 5/1998 | Watanabe et al. | 714/6 |
| 5,758,050 A * | 5/1998 | Brady et al. | 714/1 |
| 5,867,686 A * | 2/1999 | Conner et al. | 711/168 |
| 5,884,093 A * | 3/1999 | Berenguel et al. | 710/1 |
| 5,901,327 A * | 5/1999 | Ofek | 710/5 |
| 5,917,965 A * | 6/1999 | Cahill et al. | 382/305 |
| 5,924,090 A * | 7/1999 | Krellenstein | 707/5 |

(Continued)

FOREIGN PATENT DOCUMENTS

JP 01240944 A * 9/1989

OTHER PUBLICATIONS

Microsoft, "Computer Dictionary", 2002, Fifth Edition, p. 336.*

*Primary Examiner*—Matt Kim
*Assistant Examiner*—Christopher D Birkhimer
(74) *Attorney, Agent, or Firm*—Chapin IP Law, LLC

(57) ABSTRACT

A file storage system can include a file manager that adaptively partitions memory to accommodate the storage of fragmented data information. The fragments, potentially of varying size, can be stored in a volume of memory that is partitioned to include a group of storage segments. In the event that a particular fragment is not sized to efficiently fit in a free storage segment, the segment can be further subdivided to accommodate a fragment. In this way, a segment allotted for storage of data information can be adaptively subdivided into a smaller group of storage sub-segments. These sub-segments and yet potentially smaller storage partitions of the sub-segments can then be used to store additional fragments of a related stream of data. Based on this technique, portions of a logical stream of data information can be stored in the segments that vary in size. Meta data associated with the stored fragments can be used to facilitate reconstruction of a file or data stream.

20 Claims, 9 Drawing Sheets

U.S. PATENT DOCUMENTS 5,926,833 A * 7/1999 Rasoulian et al. ........... 711/147
5,931,907 A * 8/1999 Davies et al. ............... 709/218
5,956,745 A * 9/1999 Bradford et al. ............ 711/137
5,983,240 A * 11/1999 Shoroff et al. .............. 707/200
5,999,435 A * 12/1999 Henderson et al. ............ 365/49
6,151,665 A * 11/2000 Blumenau ................... 711/162
7,032,125 B2 * 4/2006 Holt et al. ..................... 714/6

* cited by examiner

Meta Data Descriptor Key

NO = next offset ("address") of data stream segment

NL = next level (0,1,2,3...) of data stream segment

FS = free space blocks in subtree

COG = center of gravity

T = type of meta data
- 00 = free memory space (unused)
- 01 = stream data
- 10 = end of stream data
- 11 = subtree

Fig. 5 reconstruction of logical data stream A:

reconstruction of logical data stream B:

reconstruction of logical data stream C:

| Level | Number Free Blocks | Size of Free Blocks |
| --- | --- | --- |
| 0 | 2 | 64 bytes |
| 1 | 0 | 256 bytes |
| 2 | 0 | 1024 bytes |
| 3 | 0 | 4096 bytes |

| Level | Number Free Blocks | Size of Free Blocks |
| --- | --- | --- |
| 0 | 3 | 64 bytes |
| 1 | 2 | 256 bytes |
| 2 | 1 | 1024 bytes |
| 3 | 0 | 4096 bytes |

UTILIZATION OF MEMORY STORAGE

RELATED APPLICATIONS

This application is a continuation-in-part of U.S. application Ser. No. 10/161,219, filed May 31, 2002 now abandoned, which itself claims the benefit of U.S. Provisional Application No. 60/295,268 filed on Jun. 1, 2001, U.S. Provisional Application No. 60/296,047 filed on Jun. 5, 2001, and U.S. Provisional Application No. 60/385,351 filed on May 31, 2002, the entire teachings of all of which are incorporated herein by reference.

BACKGROUND OF THE INVENTION

Every file system has a storage manager that defines how blocks of memory storage are allocated and deallocated to store logically related data information. In certain applications, memory storage is logically divided into fixed, same-length blocks. For example, block sizes are typically selected so that they are small relative to the size of corresponding files that are to be stored. This is done in order to minimize waste of storage space.

To facilitate file reads and writes, blocks are sometimes allocated in sequential order so that reads and writes of a long data stream can be performed more efficiently. However, as files are created, modified, or deleted, the free space on the storage can quickly become sporadically located on a disc. Consequently, sequential block allocation of memory can become cumbersome and quite complex.

SUMMARY OF THE INVENTION

The present invention is directed towards advancing the state of the art in memory storage and related technology. According to one aspect of the present invention, a file storage system includes a file manager that adaptively partitions memory to accommodate the storage of fragmented data files. Meta data can be used to track the fragments of data information stored in the partitions.

Storage of data information can entail first receiving a logical stream of data information that is divided into fragments. The fragments, potentially of varying size, can be stored in a volume of memory that is logically partitioned to include a group of storage segments. In the event that a particular fragment or unstored portion of a data file is not sized to efficiently fit in a free storage segment, i.e., the fragment cannot be stored without undue waste, the volume of memory can be further subdivided. More specifically, a segment allotted for storage of data information can be adaptively subdivided into a smaller group of storage sub-segments. These sub-segments and yet potentially smaller storage partitions of the sub-segments can then be used to store additional fragments of a related stream of data. Based on this technique, portions of a logical stream of data information can be stored in the segments that vary in size.

As an example of storing data information, consider a fragment of a file that would otherwise fill only ¾ of a free storage segment in memory. Rather than store the fragment in the storage segment and waste ¼ of the free space in that particular segment, the segment can be adaptively subdivided into, e.g., four sub-segments. The fragment itself can then be strategically divided into smaller fragments and stored in three of the four sub-segments without wasting memory space. In this way, a logical stream of data can be fragmented or partitioned to fill a segment and fewer than all corresponding sub-segments of finer resolution. Unused sub-segments can be used to store data information associated with yet other independent data streams.

The adaptive subdividing can be precipitated based on a present or anticipated need for smaller storage segments to store data information.

A segment can be subdivided into multiple sub-segments of substantially similar size. For example, in one application, a segment is divided into multiple contiguous sub-segments based on a power of 2. That is, a segment can be adaptively sub-divided to include 2, 4, 8, 16, . . . sub-segments. Sub-segments can be further subdivided in a similar manner for storing fragments of finer resolution.

Adaptively partitioning a volume of memory in this way can reduce the amount of wasted or unused memory space because successive fragments of a logical data stream can fit into the segments, sub-segments and yet further subdivisions without wasting excess memory space.

A portion of a volume of memory can be allocated for storage of meta data. Such meta data information can be stored in respective meta data fields associated with segments and sub-segments to describe their contents. Additionally, the meta data associated with a segment can store information about other segments in a related stream of data. Consequently, the meta data can be used to aid in the reconstruction of a fragmented data stream or file stored in multiple segments.

In one application, meta data fields are stored near contiguous or related groups of storage segments. In this instance, a group of similarly sized storage segments can include allocated memory space for meta data fields. Thus, each segment in a group of segments can have corresponding meta data stored nearby. Similarly, each sub-segment in a group of sub-segments can have corresponding meta data that resides nearby.

The meta data for a given group of segments or sub-segments can be stored at a specified location with respect to a corresponding group so that is easy to find. For example, the meta data for a given group of segments or sub-segments can be stored at the beginning or end of a group. Knowing a location of meta data that is integrally stored with fragmented filed stored in the segments renders it an easier task for a file manager to locate and store fragments of a logical data stream. Based on the techniques according to certain principles of the present invention, a file manager can locate meta data associated with a segment based on mere knowledge of the data structure that is used to store fragments.

Meta data associated with a particular segment of stored data information can vary depending on an application. For example, the meta data can include a pointer such as an offset address or absolute address. The pointer can be used to identify a location of another segment or sub-segment of related data information that is used to store additional fragments of a logical data stream. Consequently, a fragmented logical data stream stored in a volume of memory can be reconstructed based upon use of the pointers stored in meta data fields that identify locations of additional contiguous fragments of a data file.

In one application, specific meta data is maintained for each or a substantial portion of the variably sized storage segments. For example, a meta data field for storing meta data information can be created and tracked for each segment or sub-segment stored in memory. As mentioned, this meta data information stored in the meta data fields can be used to reconstruct a logical data stream.

Meta data stored in a meta data field can identify a type of data information stored in corresponding segments of memory. For example, certain meta data such as a multi-bit identifier can indicate that a corresponding segment is free. A table separate from meta data integrally stored with corresponding fragments in memory can also be used to track the amount of unused storage segments and sub-segments by their size.

Other meta data in a meta data field can indicate that the corresponding contents of a segment (such as a fragment) is a middle or end portion of a logical stream of data. Additionally, the meta data information associated with a segment can indicate that the corresponding segment is broken down into further sub-segments. Meta data also can be maintained for each of the sub-segments, and smaller subdivisions, recursively.

A method of reconstructing a logical stream of data information stored in the volume can include first identifying a storage segment storing at least part of the logical stream of data to be reconstructed. The identified storage segment can include the first fragment of the logical data stream to be reconstructed. A file manager can utilize meta data associated with the identified storage segment to identify a next contiguous fragment of the logical data stream that is to be reconstructed. For example, meta data stored in a meta data field of the identified segment can include a pointer that indicates a location of a segment storing a next contiguous fragment of the logical data stream. In this way, meta data information associated with the segments can be used to locate additional fragments of the stored logical data stream.

The fragments of a file or logical stream of data information can be distributed into multiple storage segments that are substantially near each other. Consequently, an entire logical data stream can be stored in relatively close proximity to simplify the process of retrieving it from memory.

A parameter can be maintained to identify an approximate location of where a stream of logically related data information is stored in the volume. For example, the parameter can be a weighted average of the location where multiple fragments stored in multiple segments reside in memory. Thus, the parameter can be maintained to identify an approximate whereabouts of at least a substantial portion of the logical data stream stored in memory.

If a logical data stream needs to be updated by storing additional fragments in memory, the parameter also can be updated to identify a new approximated center of where a logical data stream is stored. Given the approximate whereabouts of a stream, additional fragments of a data stream can be stored in free space nearby so that fragments of the same file are stored near each other or contiguous to a last stored chunk for easy retrieval.

Notably, the location parameter can be stored along with other meta data associated with a stream of data. In a specific application, the parameter is stored in a meta data field associated with a segment storing the last fragment of a logical data stream.

Any suitable storage device can be used to store fragments of data streams. Preferably, the memory is a type that can be partitioned into segments and sub-segments. One application involves the use of a volume of linear storage space such as a disc storage device.

The present invention is advantageous over the prior art because it supports a more efficient use of memory storage. For example, there is no substantial limitation regarding a use of storage block size. Consequently, wasted memory space is minimized and free space is easily managed because segments can be adaptively subdivided to store fragments of data information that vary in size.

Use of meta data integrally stored with corresponding data information can alleviate the need for maintaining bitmaps of free space. That is, the meta data itself can identify free space. Additionally, the meta data can be more quickly retrieved when it is collocated with corresponding data information.

A location of corresponding meta data can be easily determined when it is stored in a known location relative to a segment. In one application, a portion of memory is reserved in case a segment is subdivided and there becomes a need to store corresponding meta data.

Storage of fragmented data streams into larger and potentially successively smaller blocks can render it easier to retrieve a data stream. For example, retrieval of larger fragments means less meta data must be processed to locate other fragments to reconstruct a data stream.

Lastly, adaptively partitioning memory according to the principles of the present invention enables a file manager to manage the memory differently than in the prior art. Based upon the aforementioned data structure, a volume of memory storage can be viewed as a hypercubic structure in which variably sized segments are defined on different tiers although the memory is otherwise linear storage space.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a chart describing meta data according to certain principles of the present invention.

FIG. 11 is a diagram identifying free storage space according to certain principles of the present invention.

FIG. 12 is a diagram identifying free storage space after a file is deleted according to certain principles of the present invention.

DETAILED DESCRIPTION OF THE INVENTION

A description of preferred embodiments of the invention follows.

Figure 1:
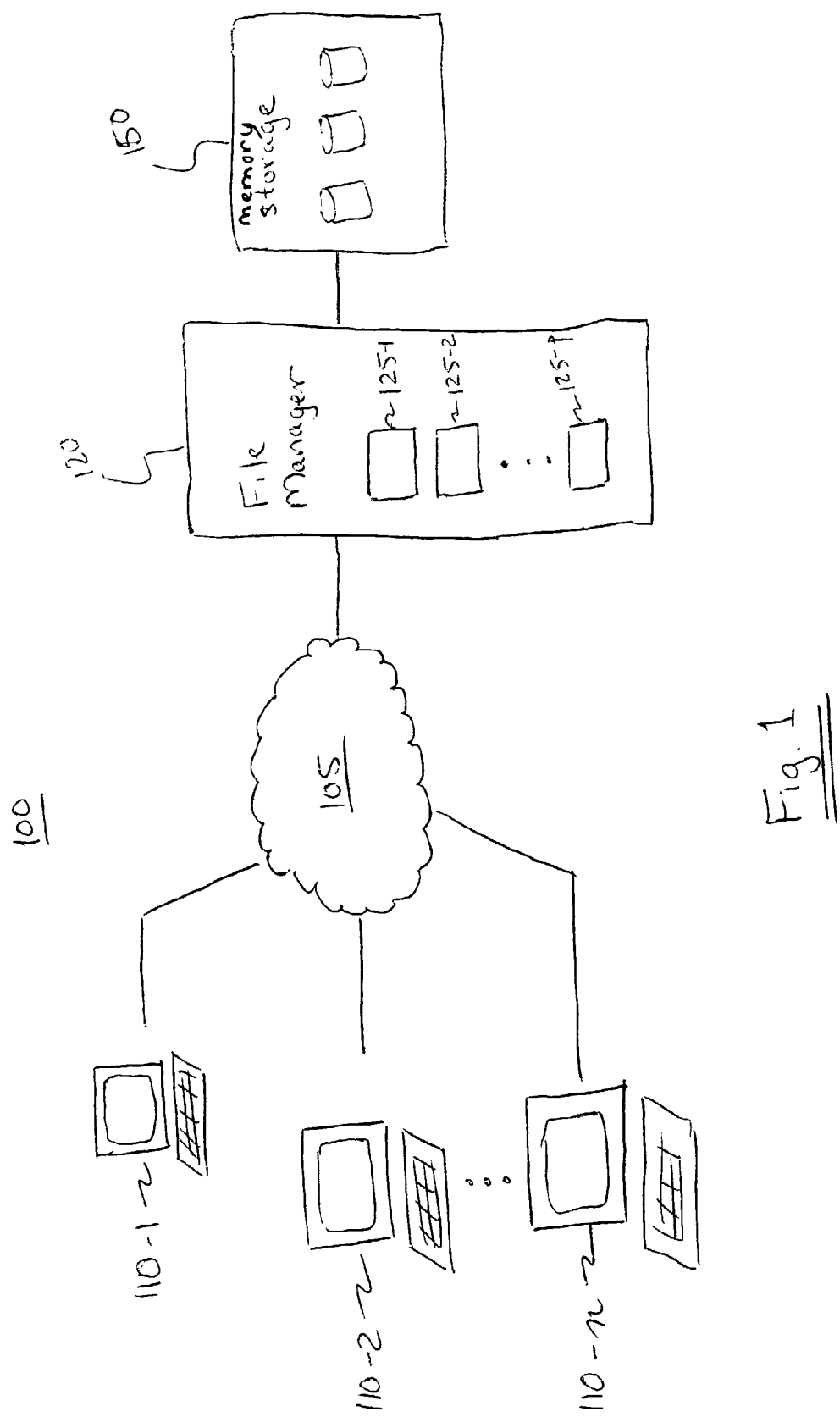
FIG. 1 is a block diagram of a memory storage system according to certain principles of the present invention.

FIG. 1 is a block diagram of a memory storage system according to certain principles of the present invention. As shown, processor devices such as computers 110-1, 110-2, ..., 110-n are coupled to network 105 to support access to memory storage device 150. File manager 120 facilitates storage and retrieval of data information to and from memory storage device 150. Tables 125-1, 125-2, ... 125-p can be used to manage data information stored in memory storage device 150.

Memory storage device 150 can be external memory storage such as disk drives, tape drives, caches, memory cards, chips, or semiconductor devices. In general, any suitable memory device can be used.

In one application, memory device 150 includes a volume of linear storage space. Specific data structures and techniques for storing the data information will be discussed later in this specification.

As suggested above, file manager 120 is responsible for naming, storing, and organizing files. During operation, file manager 120 receives file processing requests from users at computers 110. Network 105 enables multiple users to share use of memory storage device 150. In other applications, memory device 150 is dedicated for use by a single computer.

Upon receipt of a request or command generated by a user at computer 110, file manager 120 processes the received command. Typically, the operating system in file manager 120 translates the command or request from application programs running on computers 110 into low-level, sector oriented tasks that can be understood by drivers controlling memory storage device 150. In this way, file manager 120 can access memory device 150 to process requests and facilitate a transfer of files between computers 110 and storage device 150 over network 105.

File manager 120 can also ensure synchronization of access between nodes.

Table 1 below includes a list of data information maintained by file manager 120 to track files according to certain principles of the present invention. The contents of table 1 can be stored in table 125-1 shown in FIG. 1 or any other pertinent location.

TABLE 1

| File or data stream identifier | pointer or offset value (hexadecimal) | segment size (bytes) | Level |
|---|---|---|---|
| A | 0x0800 | 1024 | 2 |
| B | 0x0400 | 1024 | 2 |
| C | 0x0000 | 256 | 1 |
| . | . | . | . |
| . | . | . | . |
| . | . | . | . |

As shown, each file or data stream in table 1 has an associated pointer or address offset value that indicates a "start" location in memory where at least a first fragment of a corresponding file or logical data stream is stored. Additional information such as segment size can be stored in table 1 to identify the size of the first fragment of data information for a given data file or stream. Use of the information in this table will be discussed later in this specification.

Figure 2:
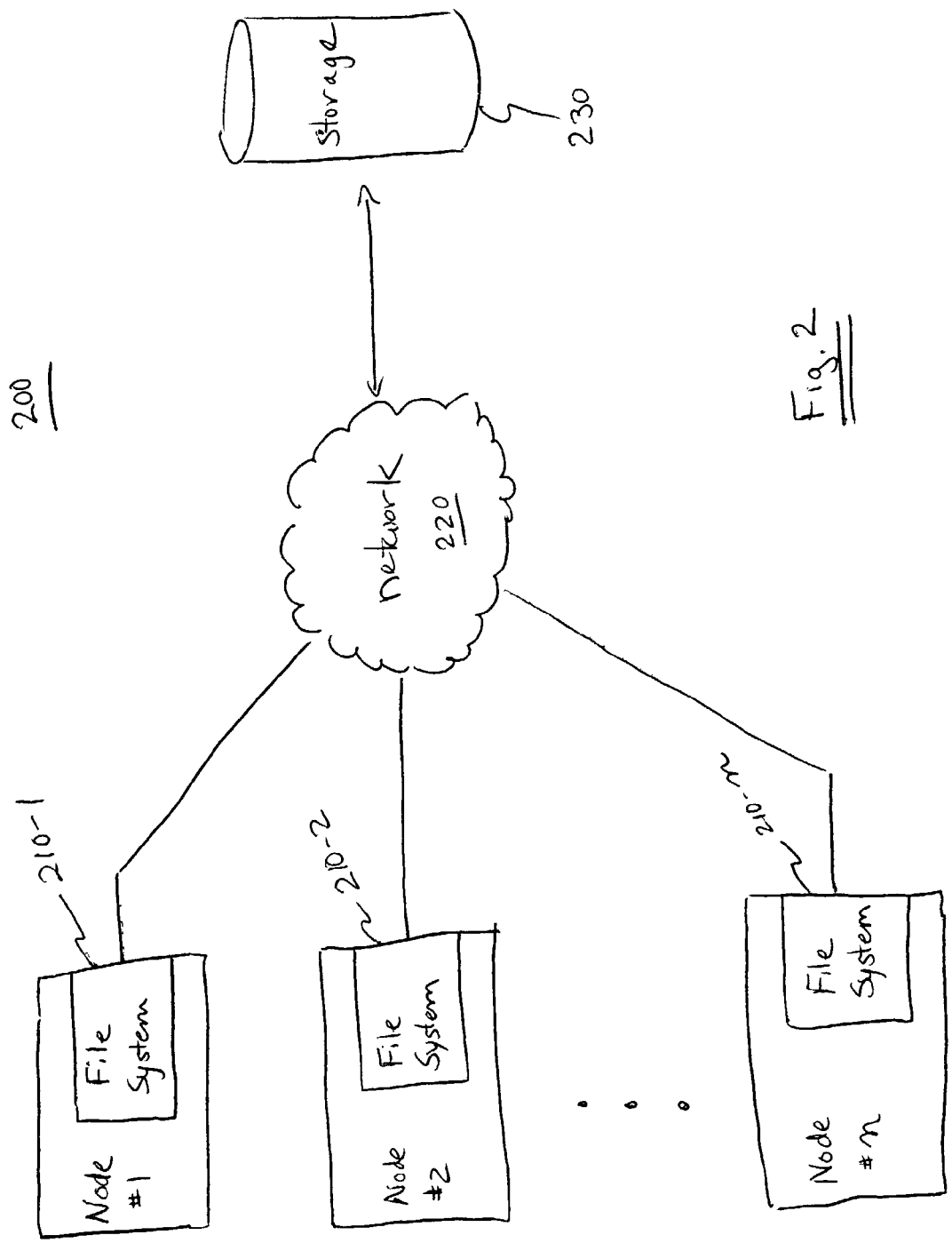
FIG. 2 is a block diagram of a memory storage system according to certain principles of the present invention.

FIG. 2 is a block diagram of storage system 200 according to certain principles of the present invention. Nodes coupled to clusters of computers can operate to simultaneously access similar areas of storage.

A local version (as well as file manager 120 discussed in FIG. 1) of file system 210-1, 210-2, ... 210-n can include several components. For example, a high-level software function of file system 210 can make use of stored and retrieved logical streams. Consequently, file system 210 can handle actual user requests for storing and retrieving data streams.

Each file system 210 can include a transaction manager, which is a module providing implicitly synchronized, journaled access to storage 230. To perform these tasks, the transaction manager can communicate over a fiber channel through network 220 to memory storage 230. Additionally, the transaction manager can communicate with user computers coupled to nodes 205. Typically, file system 210 communicates with other nodes and storage 230 using a TCP/IP or other suitable protocol.

Network 220 can include a combination of communication devices supporting communication protocols so that nodes 210 can communicate with each other and with storage 230. Memory storage 230 can include hardware that carries out low-level storage operations such as read and writes from/to consecutive blocks of data.

A node can be initiated by a high level user request that is transmitted to a corresponding file system. High level user requests received by a file system can be translated into a series of communication packets or messages that are sent to other nodes. These messages such as I/O requests are transmitted over network 220 to memory storage 230.

Memory storage device 230 can manage large amounts of data. In one application, a contemporary disk array can handle from hundreds to ten thousands GB (Gigo Bytes) of information. The Aviv Santera200 Raid controller can be used to support access to storage 230. Also, any suitable operating system can be used. For example, the operating system can be Windows NT, 2K, XP, or a UNIX derivative like Solaris or MAC OS X™.

Typically, memory 230 is not filled to capacity during operation since this may otherwise degrade system performance.

Communication hardware can include FC (Fiber Channel) equipment such as a host of bus adapters, ethernet adapters, FC switches, hubs, ethernet switches and hubs, cables, etc.

Figure 3:
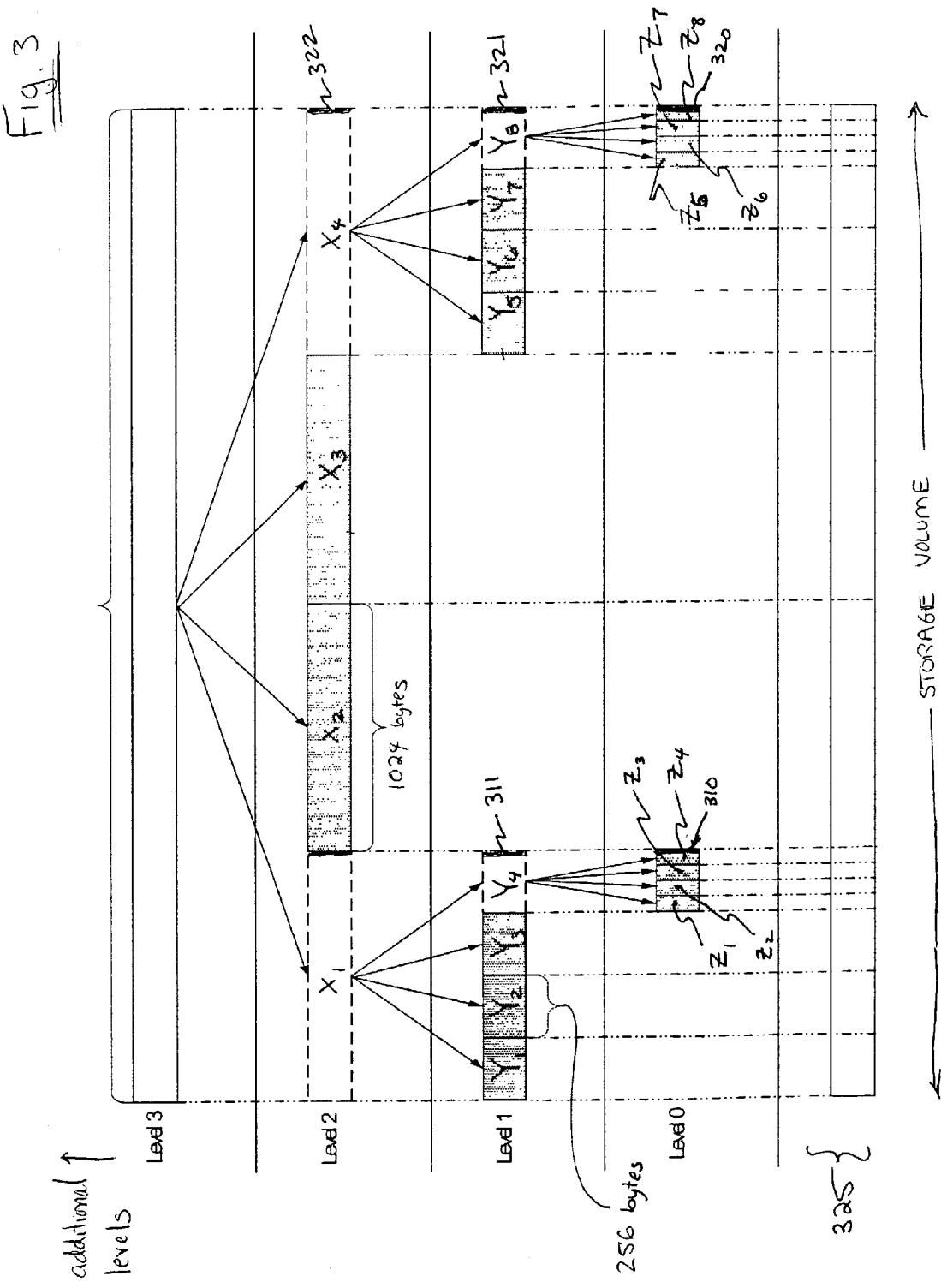
FIG. 3 is a diagram illustrating a data structure and a technique of adaptively subdividing memory according to certain principles of the present invention.

FIG. 3 is a diagram illustrating a technique of managing memory according to certain principles of the present invention. As shown, memory storage 325 such as a volume of linear storage can be partitioned into segments and sub-segments to facilitate storage of variably-sized files or data streams. For example, segment-size can vary depending on how a volume of memory device 150 is partitioned. Each level identifies an allocation of similarly sized memory segments. Generally, segment size increases for each successively higher level.

Level 0 identifies the smallest possible partition of memory space for data information. In one embodiment, segment $Z_1$ and those of similar size on level 0 are 64 bytes wide. It should be noted that the size of a smallest segment can vary depending on the application.

Segments stored on level 1 are equivalent in size to a combination of multiple sub-segments. More specifically, segment $Y_1$ can be equivalent in size to a combination of segments $Z_1$, $Z_2$, $Z_3$, and $Z_4$. In this way, memory storage space 325 can be partitioned into large segments, which are potentially subdivided into smaller sub-segments. It should be noted that a degree of partitioning can vary from level to level.

A portion of memory storage 325 can be allocated for storage of meta data. For example, meta data 311 can be allocated to describe data information stored in the corresponding group of segments $Y_1$, $Y_2$, $Y_3$, and $Y_4$. Likewise, meta data 310 can be allocated to describe data information stored in corresponding group of segments $Z_1$, $Z_2$, $Z_3$, and $Z_4$; meta data 322 can be allocated for segments $X_1$, $X_2$, $X_3$, and X4; meta data 321 can be allocated for segments Y5, Y6, Y7, and Y8; meta data 320 can be allocated for segments Z5, Z6, Z7, and Z8.

In general, meta data associated with a group of segments is allocated from a portion of memory near the end of a group as shown. Meta data associated with lower levels can be stored closer to the end of a segment or subtree. Consequently, the maximum capacity of a corresponding end most segment in a group can be reduced by the amount of meta data fields allocated for use in the particular last segment. Alternatively, an extra portion of memory can be allotted in the memory storage device 150 or separate memory storage in file manager 120 to store meta data associated with segments and sub-segments.

In certain applications, the technique of integrally storing meta data along with fragmented file information is used so that substantially all segments in a group fall on an even addresses that is a multiple of 2. This is because segments themselves can be subdivided based on a power of 2. More specifically, a segment can be subdivided into 2, 4, 8, 16, ..., and so on, sub-segments. In this instance, the address of the segments are easily managed.

In a specific application, segments associated with a particular level are subdivided to produce 64 sub-segments on a successive lower level. Notably, the number of subdivisions can also vary from level to level.

Figure 4:
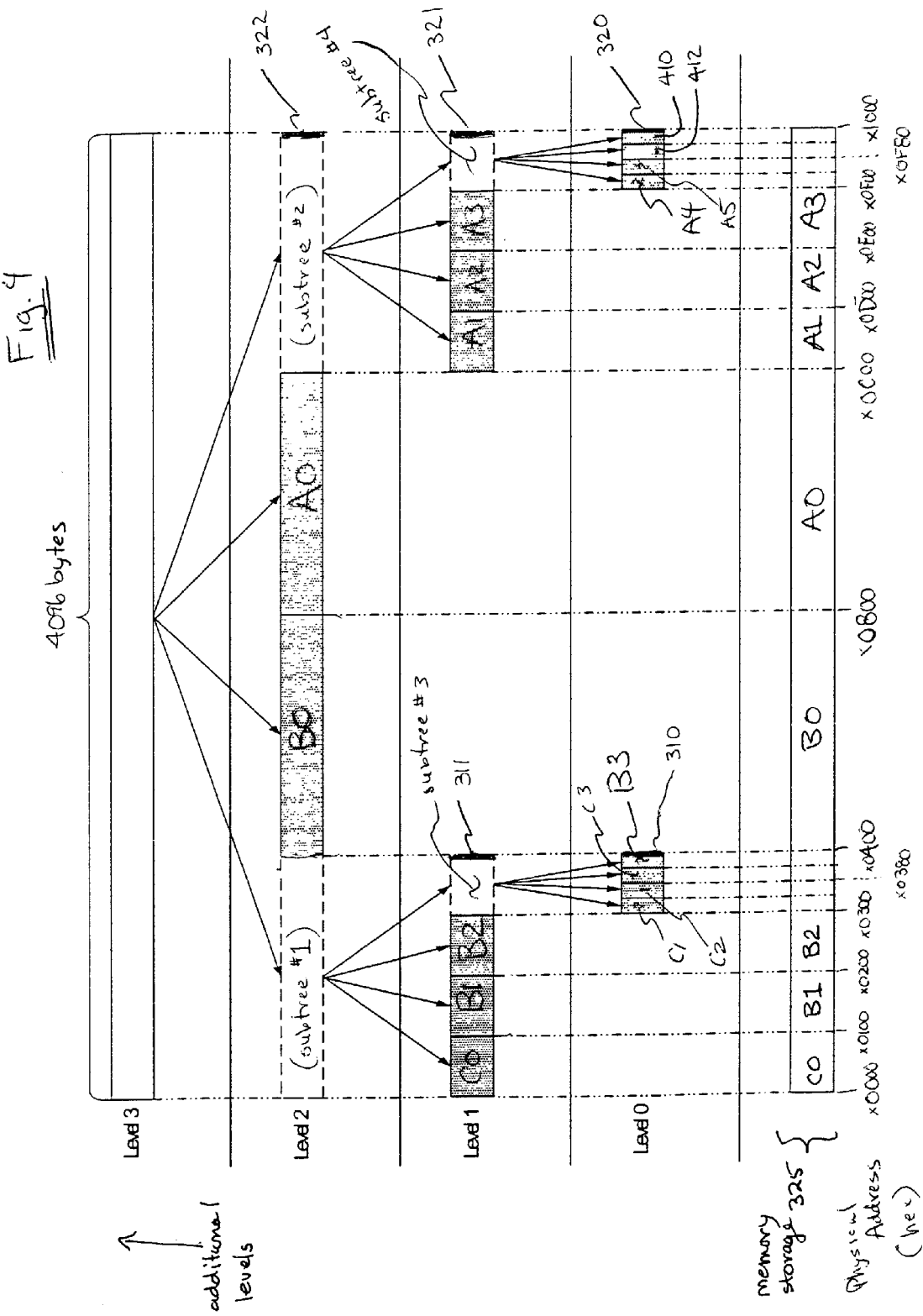
FIG. 4 is a diagram identifying storage of data information according to certain principles of the present invention.

FIG. 4 is a diagram of partitioned memory at least partially filled with data information according to certain principles of the present invention.

Multiple data streams or data files are stored in segments and sub-segments. For example, logical data stream A comprises file fragments stored in segments A0, A1, A2, A3, A4, and A5. Likewise, logical data stream B comprises fragments stored in segments B0, B1, B2, and B3. Logical data stream C comprises fragments stored in segments C0, C1, C2, and C3.

As previously discussed in FIG. 2, file manager 120 can maintain a pointer that identifies at least a beginning of a corresponding data stream or data file stored in memory device 150. For example, the pointer for data stream A stored in memory 150 is 0800 hex. Thus, the fragment of information stored in segment A0 can include the first portion of data stream A. Successive portions of data stream A includes the fragments stored in segments labeled A1, A2, A3, A4, and A5.

Referring again to the diagram of data structures in FIG. 4, it should be noted that data streams can be processed and partitioned by file manager 120 before they are stored in memory device 150.

The process of storing a data stream can entail receiving the data file and comparing the file to the largest available free segment of storage. If the file is larger than an available segment, the file is partitioned such that the first portion or fragment of the file that fits in the segment is stored in the free segment. It is then determined whether the unstored portion of the file is smaller than a segment on the same level that the previous fragment was stored. If the remaining portion is smaller, it is determined whether there are any free (smaller) segments at a next lower level. If not, a nearby segment on the same level as the previous stored fragment can be adaptively subdivided to include multiple sub-segments. Additional fragments can then be stored in these sub-segments and yet further subdivisions of the sub-segments in a similar manner as discussed above until any remaining portion of an unstored data stream is stored in the smaller segments. It is possible that remaining fragments of a file fit efficiently in a segment at higher levels without having to store part of the file at the lowest level. In this way, a file can be fragmented and stored in relatively few segments without wasting large amounts of memory space.

Meta data can be integrally stored along with file fragments stored in memory device 150. For example, as each successive fragment of a file is stored in a segment of memory device 150, corresponding meta data describing the fragment also can be stored in memory device 150.

According to one aspect of the present invention, fragments of a related data stream can be stored in non-contiguous segments that vary in size. Data streams B and C both illustrate this case. For example, segments B1 and B2 separate segments C0 and C1. Similarly, segment B2 and next logical fragment in segment B3 are separated by a combination of segments C1, C2 and C3. This illustrates how memory device 150 can be filled with sporadically located information.

Note also that a data stream can be stored in contiguous segments that vary in size. For example, contiguous data stream A is stored in contiguous segments A0, A1, A2, A3, A4, A5 of varying size defined between logical addresses between 0x0800 and 0x0F80.

Figure 6:
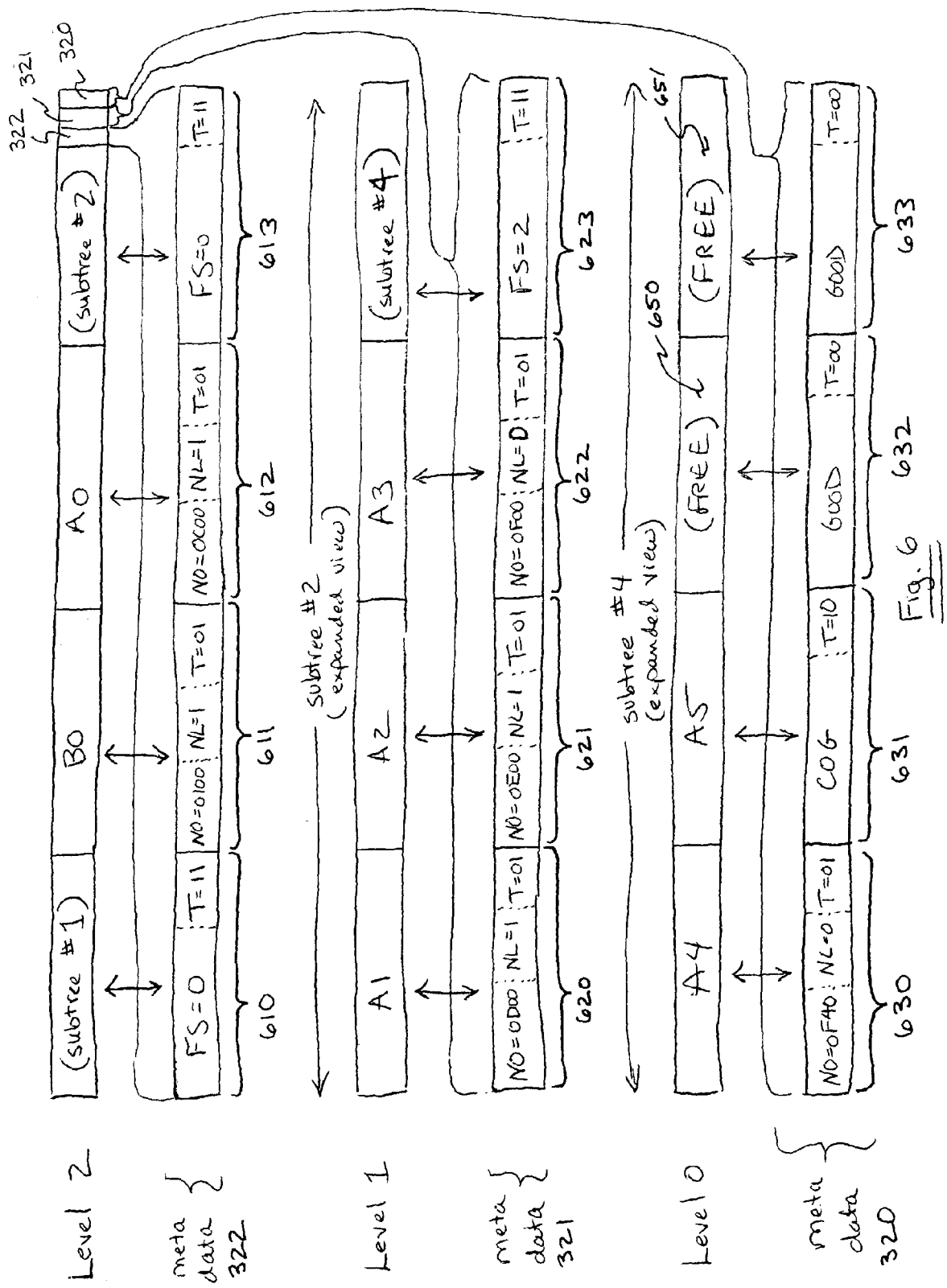
FIG. 6 is a diagram illustrating a more detailed view of adaptively subdividing memory segments and storing meta data according to certain principles of the present invention.
Figure 7:
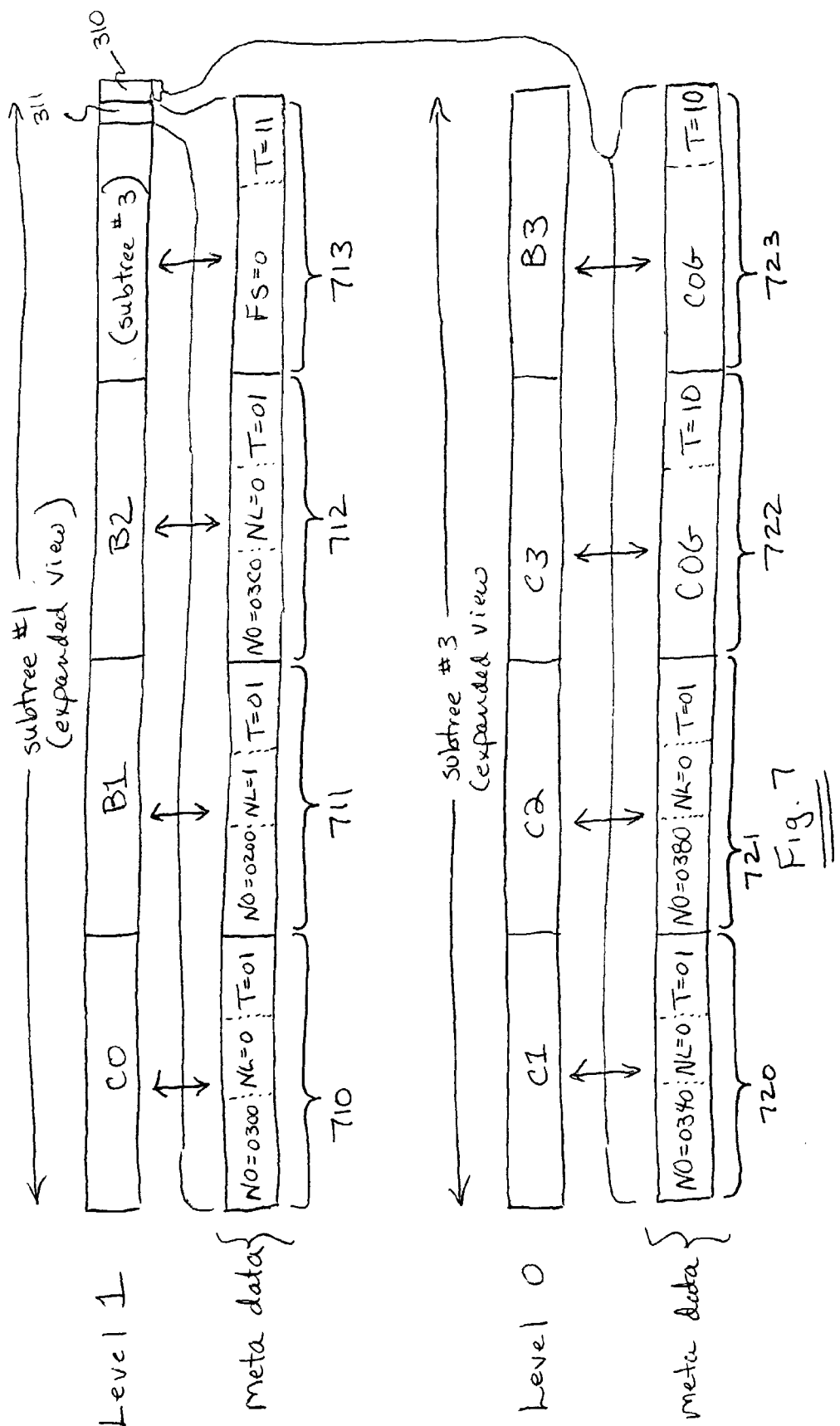
FIG. 7 is a diagram illustrating a more detailed view of adaptively subdividing memory segments and storing meta data according to certain principles of the present invention.

FIGS. 6 and 7 are more detailed diagrams illustrating information that is stored for a corresponding file or data stream. Segments labeled subtree #1, B0, A0 and subtree #2, have associated meta data 322. An expanded view of meta data 322 includes respective meta data fields 610, 611, 612 and 613.

In general, each meta data field describes information in corresponding segments in memory device 150. For example, meta data field 610 stores information describing contents of segment labeled subtree #1; meta data field 611 describes contents of segment B0; meta data field 612 describes contents of segment A0; and meta data field 613 describes contents of segment labeled subtree #2, and so on. In a similar manner as described and shown pictorially, meta data 321 is used to describe contents of segments A1, A2, A3 and subtree #4; meta data 320 is used to describe contents of segments A4, A5 and 2 free segments 650 and 651.

It should be noted that meta data associated with a segment can be stored in a data structure as shown to facilitate retrieval of meta data information associated with a block. For example, file manager 120 can easily identify which meta data is associated with a segment based upon a knowing a location of the meta data in the overall data structure. As shown, meta data is stored so that it is rightmost in a partition in a group of segments.

In FIG. 7, meta data 311 describes segments labeled C0, B1, B2 and subtree #3. Similarly, meta data 310 describes segments C1, C2, C3 and B3.

In the event that memory is expanded by adding a new volume such as another memory disc, then only certain meta data on each level will be stored in the new memory volume to support continued use of the previously existing volume of memory. Consequently, the data structure according to certain principles of the present invention can support the expansion of memory without having to labor over reorganizing or moving fragments stored in the original volume. In one application, only the rightmost branch of meta data needs be moved to the newly added storage volume.

Referring again to FIG. 6, the meta data associated with the segments can be used to identify its contents and reconstruct a file or logical data stream. As mentioned, table 125-1 can include pointers identifying a start location of a data file and a corresponding size of a fragment. For data steam A, the start address for the first fragment is 0800 hex and the size of the first fragment is 1024 bytes on level 2. This information enables file manager 120 to easily locate and retrieve contents of segment A0.

Meta data field 612 associated with segment A0 supports the storage of useful information regarding contents of segment A0 and related fragments of data stream A. For example, two bits in meta data field 612 are used to identify a type of data stored in segment A0. As shown, the type is identified as T=01 binary (type=01) indicating that the type of information stored in segment A0 is a beginning or middle of a data stream, e.g., segment A0 is not the end of a data stream. Additional details related to data stored in the meta data fields is shown in FIG. 5.

Because the present segment A0 is not labeled as the end of a data stream, the additional information in meta data field 612 is used to locate a next logical fragment of the data stream to be reconstructed. For example, NO (a.k.a., next offset) and NL (a.k.a., level of next offset) identify the next logical fragment in a sequence. According to the information in meta data field 612, the next fragment of data associated with data stream A is located at physical address 0C00 hex. The information NL=1 indicates that the next logical segment is located on level 1 and, thus, has a known length of 1024 bytes. Based on this information, the contents of segment A1 is then retrieved from memory as the second fragment of data stream A.

In a similar manner as previously discussed, information in meta data field 620 is processed to identify the contents of segment A1. Since associated meta data field 620 indicates T=01, it is known that the fragment stored in segment A1 is part of data stream A. It is also known that the fragment is not the end of data stream A. The balance of information in meta data field 620 indicates that the next fragment of the data stream is stored in segment labeled A2. Pointer information indicates that the address of segment A2 is physical address 0D00 hex. The stored information NL=level 1 indicates that the length of the next segment, is also 1024 bytes.

Figure 8:
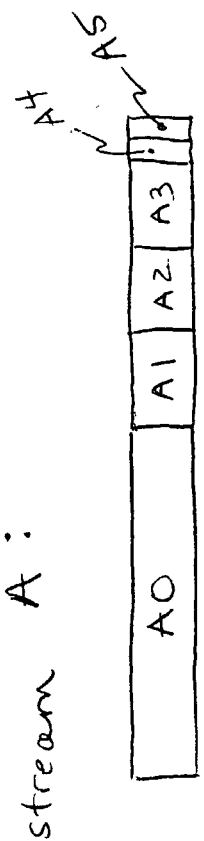
FIG. 8 is a diagram of a reconstructed logical data stream according to certain principles of the present invention.

Generally, the above process of retrieving successive fragments is repeated until meta data 631 associated with segment A5 is eventually processed by file manager 120. Initially, the "type" identifier is processed. The stored information Type=10 in meta data field 631 indicates that the fragment of information stored in segment labeled A5 is the end of fragment of the corresponding data stream. Thus, file manager 120 has retrieved all of the data associated with a particular file or data stream. FIG. 8 is a diagram of a reconstructed data stream A including the retrieved fragments.

A balance of information stored in meta data field 631 (COG=center of gravity) is a parameter that identifies an approximate or weighted address of where a particular data stream is stored in memory device 150. This information can be used by file manager 120 to locate nearby free space in the event that a data stream must be extended.

To extend a data stream, file manager 120 can search nearby segments (based on COG) by reviewing corresponding meta data to find free space. For example, the "type" information in a meta data field can be reviewed to determine whether a segment is free or unused. Meta data associated with segments 650 and 651 indicate that these segments are unused since T=00 in respective meta data fields 632 and 633. A balance of data in meta data fields 632 and 633 can indicate whether the memory is unused because it is a known bad memory segment, that a virtual segment is beyond the end of a the storage memory, or that it is simply a good segment free for use.

It should be noted that meta data associated with subtrees (certain sub-divided segments) can also be processed to locate free storage space. More specifically, meta data associated with segments at higher levels can be reviewed to determine whether a particular segment is subdivided into sub-segments. If so, the type (T) identifier will be set to 11. A balance of meta data associated with such a segment type can indicate how many sub-segments in a subtree are free.

Note that meta data field 613 (via T-11) indicates that the segment labeled subtree #2 is a subtree or segment divided into multiple sub-segments. Additional information in meta data field 613, namely, FS=0 (free space), indicates that there are no free sub-segments associated with subtree #2.

Information in meta data field 623 associated with the segment labeled subtree #4 indicates via data information FS=2 that there are two free sub-segments associated with subtree #4. The free sub-segments are segment 650 and 651.

Figure 9:
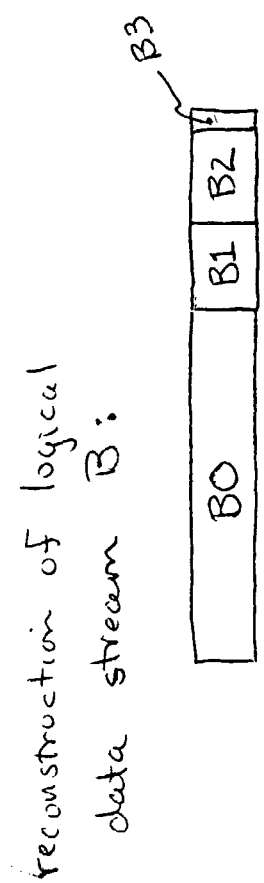
FIG. 9 is a diagram of a reconstructed logical data stream according to certain principles of the present invention.
Figure 10:
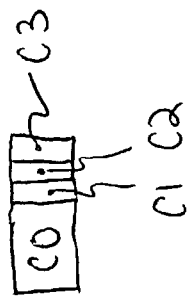
FIG. 10 is a diagram of a reconstructed logical data stream according to certain principles of the present invention.

FIGS. 9 and 10 are respective diagrams of logical data streams B and C. In a similar manner as previously discussed, file manager 120 can utilize table 125-1 to identify a segment in which a first fragment associated with a stream is stored. The meta data associated with the identified segment is then used to retrieve additional successive fragments of a logical stream.

FIGS. 11 and 12 are diagrams of information that can be maintained by file manager 120 to track free space in memory volume shown in FIGS. 4, 6 and 7. As shown in FIG. 11, there are two free segments, namely, segments 410 and 412, located on level 0 in memory space 325. Assume that data stream or file B is deleted. In this instance, the meta data associated with fragments of data stream B would be updated to indicate that the segments labeled B0, B1, B2, B3 are now free. Table 125-2 in FIG. 12 is updated to identify the additional free segments in each level after file B is deleted. Pointers associated with free segments can also be stored for easy look-up.

Notably, if an entire group of sub-segments in a group becomes free as a result of deleting a file, the subtree meta data information associated with an affected group can be updated so that the group of sub-segments is deleted and the subtree is converted to a single free segment rather than remain as multiple sub-segments. This process can be recursively implemented on successively higher levels to eventually convert free subtrees into higher level free segments.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of utilizing storage, the method comprising:
   allocating, via a computer system, a portion of the storage for storage of data information;
   subsequent to receiving the data information for storage, recursively partitioning storage segments of the allocated portion of the storage on an as-needed basis into successively smaller groups of storage segments that vary in size to accommodate storage of corresponding smaller fragments of related data information;
   allocating at least part of the storage to store meta data information associated with the storage segments; and
   maintaining the meta data in the storage to track a logical stream of fragmented data information;
   wherein recursively partitioning the storage segments includes:
      receiving an amount of data information to be stored in a volume;
      partitioning the volume to include a group of storage segments including a first storage segment and a second storage segment, the first storage segment defined by a first range of contiguous physical addresses, the second storage segment defined by a second range of contiguous physical addresses;

storing a first sized portion of the data information in the first storage segment;

in response to detecting that a second sized portion of the data information to be stored in the volume is smaller than a storage capacity of the second storage segment, subdividing the second storage segment into multiple sub-segments including at least a first storage sub-segment and a second storage sub-segment;

wherein subdividing the second storage segment into multiple sub-segments includes subdividing the second range of contiguous physical addresses into a first sub-range of contiguous physical addresses and a second sub-range of contiguous physical addresses, the first sub-range of contiguous physical addresses defining the first storage sub-segment of the second storage segment, the second sub-range of contiguous physical addresses defining the second storage sub-segment of the second storage segment; and in response to detecting that the second sized portion of the data information to be stored in the volume is larger than a storage capacity of the first storage sub-segment:

selecting a sub-portion of the second sized portion of the data information, the selected sub-portion equal in size to the storage capacity of the first storage sub-segment, and storing the selected sub-portion into the first storage sub-segment.

2. A method as in claim 1 further comprising:
adaptively partitioning the storage into groups of successively smaller storage elements to accommodate the storage of fragments of related data information.

3. A method as in claim 2 further comprising:
receiving a logical data stream to be stored in the storage; and
partitioning the logical data stream into fragments that are at least partially stored in the storage elements.

4. A method as in claim 1 further comprising:
maintaining a parameter that identifies an approximate location of where a stream of logically related data information is preferably stored in the volume.

5. A method as in claim 1 further comprising:
dividing a logical data stream into fragments of varying size;
storing the fragments in corresponding storage segments of varying size; and
maintaining a parameter identifying an approximate whereabouts of at least a substantial portion of the logical data stream stored in the storage.

6. A method as in claim 1 further comprising:
reconstructing a logical stream of data information stored in the storage by:
identifying a storage segment including a fragment of the data information to be reconstructed;
retrieving the fragment of data information stored in the identified storage segment;
utilizing meta data associated with the identified storage segment to determine a location of another segment storing a following logical portion of the data stream to be reconstructed.

7. A method as in claim 1 further comprising:
for groups of contiguous storage segments of substantially similar size, allocating a similarly situated block of storage space to store meta data associated with corresponding storage segments in a group.

8. A method of storing data information, the method comprising:
receiving, in a computer system, first data information to be stored in a volume;
partitioning the volume to include a group of storage segments including a first storage segment and a second storage segment, the first storage segment defined by a first range of contiguous physical addresses, the second storage segment defined by a second range of contiguous physical addresses;
storing a first sized portion of the first data information in the first storage segment;
in response to detecting that a second sized portion of the data information to be stored in the volume is smaller than a storage capacity of the second storage segment, subdividing the second storage segment of the volume into multiple sub-segments including at least a first storage sub-segment and a second storage sub-segment;
wherein subdividing the second storage segment into multiple sub-segments includes subdividing the second range of contiguous physical addresses into a first sub-range of contiguous physical addresses and a second sub-range of contiguous physical addresses, the first sub-range of contiguous physical addresses defining the first storage sub-segment of the second storage segment, the second sub-range of contiguous physical addresses defining the second storage sub-segment of the second storage segment; and
in response to detecting that the second sized portion of the first data information to be stored in the volume is larger than a storage capacity of the first storage sub-segment: selecting a first sub-portion of the second sized portion, the first sub-portion equal in size to the storage capacity of the first storage sub-segment, and
storing the first sub-portion in the first storage sub-segment.

9. A method as in claim 8, wherein the second storage segment is partitioned based on a power of 2.

10. A method as in claim 8 further comprising:
allocating at least a portion of the first storage segment to store meta data.

11. A method as in claim 10, wherein the meta data includes a pointer identifying a location of another segment in the volume.

12. A method as in claim 10, wherein the meta data includes information identifying a type of data stored in the first storage segment.

13. A method as in claim 8 further comprising:
reconstructing a data stream stored in the volume by:
identifying a storage segment including at least part of the data stream to be reconstructed;
retrieving data information stored in the identified storage segment;
utilizing meta data associated with the identified storage segment to identify another location of a segment in the volume including a following logical portion of the data stream to be reconstructed.

14. A method as in claim 8 further comprising:
allocating a portion of the second storage segment to include meta data identifying a weighted address indicating an approximated storage location in the volume where the data information is generally stored.

15. The method as in claim 8, wherein partitioning the volume includes: partitioning the first storage segment to be equal in size to the second storage segment.

16. The method as in claim 15 further comprising:
receiving a second amount of related data;
storing a first portion of the second amount of related data in a third storage sub-segment, the third storage sub-segment defined by a third range of contiguous physical addresses, the third storage sub-segment being equal in size to the first sub-storage segment and the second storage sub-segment;
partitioning the second storage sub-segment to include a first sub-sub-segment and a second sub-sub-segment, the first sub-sub-segment being equal in size to the second sub-sub-segment;
storing a second sub-portion of the second sized portion of the first data information in the first sub-sub-segment; and
storing a second portion of the second amount of related data in the second sub-sub-segment.

17. The method as in claim 16, wherein the second sub-portion of the second sized portion of the first data information is a remainder portion of the second sized portion of the first data information that is not stored in the first sub-segment.

18. The method as in claim 8, wherein the first storage segment and the second storage segment are of equal size.

19. The method as in claim 8, wherein the first storage segment and the second storage segment are contiguous with respect to each other.

20. A method comprising:
receiving, in a computer system, an amount of data information to be stored in a volume;
partitioning the volume to include a group of storage segments including a first storage segment and a second storage segment, the first storage segment defined by a first range of contiguous physical addresses, the second storage segment defined by a second range of contiguous physical addresses;
storing a first sized portion of the data information in the first storage segment;
in response to detecting that a second sized portion of the data information to be stored in the volume is smaller than a storage capacity of the second storage segment, subdividing the second storage segment into multiple sub-segments including at least a first storage sub-segment and a second storage sub-segment;
wherein subdividing the second storage segment into multiple sub-segments includes subdividing the second range of contiguous physical addresses into a first sub-range of contiguous physical addresses and a second sub-range of contiguous physical addresses, the first sub-range of contiguous physical addresses defining the first storage sub-segment of the second storage segment, the second sub-range of contiguous physical addresses defining the second storage sub-segment of the second storage segment; and
in response to detecting that the second sized portion of the data information to be stored in the volume is larger than a storage capacity of the first storage sub-segment:
selecting a sub-portion of the second sized portion of the data information, the selected sub-portion equal in size to the storage capacity of the first storage sub-segment, and
storing the selected sub-portion in the first storage sub-segment.

* * * * *